Patented Feb. 12, 1935

1,990,789

UNITED STATES PATENT OFFICE 1,990,789

PROCESS FOR THE PRODUCTION OF POLYMER-FREE ALCOHOLS

Siegfried L. Langedijk, Amsterdam, Netherlands, assignor to Shell Development Company, San Francisco, Calif.

No Drawing. Application October 12, 1932, Serial No. 637,553. In the Netherlands October 21, 1931

17 Claims. (Cl. 202—57)

It is known that by the reaction between olefines (for example, those formed by the cracking of mineral oils or mineral oil fractions and like carbonaceous material) and sulphuric acid resulting in the formation of alkyl-sulphuric acid from which, after hydrolysis, the desired alcohols are distilled off, polymers are formed, to the formation of which the unpleasant odor is ascribed which is a characteristic of the alcohols produced according to this process.

It is practically impossible to obtain the alcohol-water mixture, obtained in the distillation of the hydrolyzed alkyl-sulphuric acid, free of polymers, even if very careful fractionation were carried out.

It is impossible to produce a polymer-free alcohol by preliminarily drying the alcohol-water-polymer mixture with potassium carbonate, sodium chloride or other equivalent dehydrating agents.

It has now been found that a separation of the alcohol and the polymer cannot be practically carried out so long as water is also present. The presence of the water causes the formation of an azeotropic alcohol-water-polymer mixture, which, owing to the slight difference in boiling point compared with the remainder of the alcohol, cannot be separated therefrom by fractional distillation. The process, according to the invention, lies in the fact that the alcohol-water-mixture, contingently after having been brought to the azeotropic concentration by distillation, is wholly or partly freed from water before being distilled again. As a result of the preliminary freeing of water, the formation of an azeotropic alcohol-water-polymer mixture is no longer possible, whilst the separation of the alcohol and the polymer can be realized by a fractional distillation.

The entire or substantial removal of water may, for example, take place by subjecting the mixture to intense drying. As drying means are used: water-free copper sulphate, lime, calcium chloride, silica gel, zinc chloride, and the like substances. Potassium carbonate, however, is unable to bind the water entirely or substantially.

It is also possible to free the alcohol-mixture of water in various other ways, individually or in combination, for example, by azeotropic distillation, contingently under pressure, with the aid of an auxiliary liquid such as toluol, xylol, ethylene chloride, certain benzine fractions and the like.

Example I

An isopropyl alcohol-polymer-water mixture boiling at approximately 81° C. and containing approximately 70% by weight of isopropyl-alcohol and approximately 28% by weight of water, by azeotropic distillation yields an alcohol-water mixture containing 88% by weight of alcohol which mixture has the same unpleasant odor as the initial material. After drying this mixture with approximately 30% by weight of potassium carbonate, an alcohol-water mixture is obtained by distillation containing alcohol of 93% by weight, which mixture still has an unpleasant odor, though in a less degree, so that this alcohol is still unsuitable for some applications, for instance, in the manufacture of perfumes. If 25% by weight of water-free copper sulphate is used as a drying means instead of potassium carbonate, an alcohol boiling at 83° C., which is entirely water-free and has no unpleasant odor, is obtained by distillation.

Example II

An isopropyl alcohol-polymer-water mixture boiling at approximately 81° C. and containing approximately 70% by weight of isopropyl alcohol is subjected to an azeotropic distillation after addition of 30 parts by volume of toluol, under reflux of the upper alcoholic phase separated from the ternary distillate and continuous drawing off of the aqueous lower phase. The water-free residue in the distillation vessel containing the isopropyl alcohol is then subjected to a fractional distillation. A polymer-free alcohol is thereby obtained in a yield of approximately 90%. The aqueous bottom-layer which was continually withdrawn in the azeotropic distillation, is worked up in a known manner to an alcohol-toluol mixture which can be used for the treatment of a fresh portion of an isopropyl-alcohol-polymer-water mixture to be purified.

The process is applicable for the production of polymer-free secondary butyl, secondary amyl, secondary hexyl and higher homologous alcohols from the corresponding alcohol-polymer-water mixtures, regardless of the character of the acid preliminarily employed as an absorption agent.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. In the process for producing alcohols from olefines by the absorption of the latter in acid followed by hydrolysis, the steps of: distilling off a ternary alcohol-polymer-water azeotrope, substantially removing the water from the distillate without substantially reducing the polymer content and subsequently recovering the alcohol substantially free from polymer from the resulting substantially anhydrous alcohol-polymer mixture.

2. In the process for producing alcohols from olefines by the absorption of the latter in acid followed by hydrolysis, the steps of: distilling off a ternary alcohol-polymer-water azeotrope, substantially removing the water from the distillate by means of a dehydrating agent without substantially reducing the polymer content and subsequently recovering the alcohol substantially free from polymer from the resulting substantially anhydrous alcohol-polymer mixture by distillation.

3. In the process for producing alcohols from olefines by the absorption of the latter in acid followed by hydrolysis, the steps of: distilling off a ternary alcohol-polymer-water azeotrope, substantially removing the water from the distillate by azeotropic distillation with an extraneous agent without substantially reducing the polymer content and subsequently recovering the alcohol substantially free from polymer from the resulting substantially anhydrous alcohol-polymer mixture by distillation.

4. In the process for producing alcohols from olefines by the absorption of the latter in acid followed by hydrolysis, the steps of: distilling off a ternary alcohol-polymer-water azeotrope, substantially removing the water from the distillate by azeotropic distillation with an organic compound substantially immiscible with water without substantially reducing the polymer content and subsequently recovering the alcohol substantially free from polymer from the resulting substantially anhydrous alcohol-polymer mixture by distillation.

5. In the process for producing alcohols from olefines by the absorption of the latter in acid followed by hydrolysis, the steps of: distilling off a ternary alcohol-polymer-water azeotrope, stratifying the distillate, substantially removing the water from the alcoholic phase without substantially reducing the polymer content and subsequently recovering the alcohol substantially free from polymer from the resulting substantially anhydrous alcohol-polymer mixture by distillation.

6. In the process for producing alcohols from olefines by the absorption of the latter in acid followed by hydrolysis, the steps of: distilling off a ternary alcohol-polymer-water azeotrope, stratifying the distillate, substantially removing the water from the alcoholic phase by azeotropic distillation with an organic compound substantially immiscible with water without substantially reducing the polymer content and subsequently recovering the alcohol substantially free from polymer from the resulting substantially anhydrous-alcohol polymer mixture by distillation.

7. In the process for producing alcohols from olefines by the absorption of the latter in acid followed by hydrolysis, the steps of: distilling off a ternary alcohol-polymer-water azeotrope, stratifying the distillate, substantially removing the water from the alcoholic phase by means of an inorganic compound capable of acting as a dehydrating agent without substantially reducing the polymer content and subsequently recovering the alcohol substantially free from polymer from the resulting substantially anhydrous alcohol-polymer mixture by distillation.

8. In the process for producing alcohols from olefines by the absorption of the latter in acid followed by hydrolysis, the steps of: distilling off a ternary alcohol-polymer-water azeotrope, substantially removing the water from the distillate by means of an inorganic compound capable of acting as a dehydrating agent without substantially reducing the polymer content and subsequently recovering the alcohol substantially free from polymer from the resulting substantially anhydrous alcohol-polymer mixture by distillation.

9. In the process for producing alcohols from normal olefines by the absorption of the latter in sulfuric acid followed by hydrolysis, the steps of: distilling off a ternary secondary alcohol-polymer-water azeotrope, substantially removing the water from the distillate without substantially reducing the polymer content and subsequently recovering the alcohol substantially free from polymer from the resulting substantially anhydrous alcohol-polymer mixture.

10. In the process for producing isopropyl alcohol from propylene absorbed in sulfuric acid followed by hydrolysis, the steps of: distilling off a ternary isopropyl alcohol-polymer-water azeotrope, substantially removing the water from the distillate without substantially reducing the polymer content and subsequently recovering the isopropyl alcohol substantially free from polymer from the resulting substantially anhydrous alcohol-polymer mixture.

11. The process for producing secondary aliphatic monohydric alcohols free from polymer comprising: substantially reducing the aqueous content of a mixture of said alcohol, polymer and water without substantially reducing the polymer content and subsequently subjecting said substantially anhydrous alcohol-polymer mixture to a distillation operation.

12. In a process for producing alcohols free from polymers from aqueous mixures of alcohols containing polymers, the step of substantially reducing the aqueous content thereof by means of a dehydrating agent without substantially reducing the polymer content and subsequently recovering polymer-free alcohol from the resulting substantially anhydrous alcohol-polymer mixture.

13. In a process for producing alcohols free from polymers from aqueous mixtures of alcohols containing polymers, the step of substantially reducing the aqueous content thereof by azeotropic distillation with an extraneous agent without substantially reducing the polymer content and subsequently recovering polymer-free alcohol from the resulting substantially anhydrous alcohol-polymer mixture.

14. In a process for producing alcohols free from polymers from aqueous mixtures of alcohols containing polymers, the steps of substantially reducing the aqueous content thereof by azeotropic distillation with an extraneous agent, stratifying the distillate, substantially removing the water from the alcoholic phase without substantially reducing the polymer content and subsequently recovering polymer-free alcohol from said alcoholic phase.

15. In a process for producing alcohols free from polymers from aqueous mixtures of alcohols containing polymers, the steps of substantially reducing the aqueous content thereof by azeotropic distillation with an extraneous agent, stratifying the distillate, utilizing the alcoholic phase as reflux, withdrawing the aqueous phase until no more is formed without substantially reducing the polymer content of the alcohol-polymer mixture, and then recovering polymer-free alcohol from the substantially anhydrous alcohol-polymer residue.

16. In a process for producing alcohol free from polymers from an aqueous mixture of alcohol containing polymers, the steps of substantially removing the water from the alcohol-water-polymer mixture without substantially reducing the polymer content, and subsequently recovering alcohol substantially free from polymer from the resulting substantially anhydrous alcohol-polymer mixture.

17. In a process for producing alcohol free from polymers from an aqueous mixture of alcohol containing polymers, the step of substantially reducing the aqueous content thereof by means of a dehydrating agent of the class consisting of anhydrous copper sulphate, lime, calcium chloride, silica gel and zinc chloride without substantially reducing the polymer content, and subsequently recovering polymer-free alcohol from the resulting substantially anhydrous alcohol-polymer mixture.

SIEGFRIED L. LANGEDIJK.